United States Patent
Tachihara et al.

(10) Patent No.: US 6,396,627 B1
(45) Date of Patent: May 28, 2002

(54) STEREOSCOPIC MICROSCOPE INCLUDING ZOOM AND RELAY OPTICAL SYSTEMS

(75) Inventors: Satoru Tachihara; Chinari Tanaka, both of Saitama-ken; Daisuke Koreeda, Tokyo; Tetsuya Nakamura; Nobutaka Minefuji, both of Saitama-ken; Takaomi Sekiya; Eiichi Ito, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/584,943

(22) Filed: Jun. 1, 2000

(30) Foreign Application Priority Data

May 31, 1999 (JP) ............................................ 11-150830
May 31, 1999 (JP) ............................................ 11-152636
Dec. 28, 1999 (JP) ............................................ 11-375021

(51) Int. Cl.$^7$ ........................... G02B 21/06; G02B 21/22
(52) U.S. Cl. ..................... 359/363; 359/377; 359/385; 359/389; 396/432; 396/324; 348/42
(58) Field of Search ................................. 359/363, 369, 359/376, 377, 385, 389; 348/42; 396/432, 324

(56) References Cited

U.S. PATENT DOCUMENTS 4,341,435 A * 7/1982 Lang et al. .................. 359/385
5,825,532 A   10/1998 Mochizuki et al.

* cited by examiner

Primary Examiner—Jon Henry
(74) Attorney, Agent, or Firm—Pitney, Hardin, Kipp & Szuch LLP

(57) ABSTRACT

The stereoscopic microscope includes a common close-up optical system that faces an object, a pair of zoom optical systems that form a pair of primary image, a pair of field stops, a pair of relay optical systems that relay the primary images to form a pair of secondary images, an inter-axis distance reducing element, an image taking device and an illuminating optical system. The object light rays incident on the close-up optical system form the primary images having predetermined parallax at the field stops through the zoom optical systems. The inter-axis distance reducing element reduces the inter-axis distance of the right and left light rays. The primary images are re-imaged by the relay optical systems as the secondary images on the adjacent regions on the single image taking surface of the image taking device, respectively.

12 Claims, 9 Drawing Sheets

STEREOSCOPIC MICROSCOPE INCLUDING ZOOM AND RELAY OPTICAL SYSTEMS

BACKGROUND OF THE INVENTION

1. Field of the Invention

The present invention relates to a stereoscopic microscope for magnifying an object, and more particularly, to a stereoscopic microscope in which an image of the object is electronically taken by an image taking device such as a CCD.

2. Description of the Related Art

A stereoscopic microscope is used as a surgical microscope for magnifying minute tissues such as brain cells during surgery.

Since it is difficult to distinguish minute tissues of an intricate organ such as a brain by the naked eye, the surgical microscope is required to proceed surgery on such an organ. Besides, since it is impossible to observe the three-dimensional structure of a tissue with a monocular microscope, a stereoscopic microscope has been used to enable three-dimensional magnifying observation of the tissue in order to perform accurate operations.

However, with the conventional optical stereoscopic microscope, although a lead surgeon or his/her assistant can observe the microscopic image, other staffs such as anesthetists, nurses, interns, and advisers who works at some remote locations cannot observe the same microscopic image. Therefore, they could not pursue their share of tasks with sufficient accuracy and promptness. Similarly, the adviser could not provide timely and proper advice from the remote locations.

SUMMARY OF THE INVENTION

It is therefore an object of the present invention to provide a stereoscopic microscope, which enable the stuffs other than the lead surgeon to observe magnified stereoscopic images.

For the above object, according to the present invention, there is provided an improved stereoscopic microscope, which includes:

- a common close-up optical system that faces an object, the close-up optical system having a single optical axis;
- a pair of zoom optical systems that take object light rays passing through the different regions of the close-up optical system, respectively, to form a pair of primary images, the optical axes of the zoom optical systems being parallel to the optical axis of the close-up optical system;
- a pair of field stops that are arranged at the positions of the primary images;
- a pair of relay optical systems that relay the primary images to form a pair of secondary images;
- an inter-axis distance reducing element that brings the object light rays from the relay optical systems close to each other;
- an image taking device that captures the secondary images formed on an image taking surface thereof; and
- an illuminating optical system that guides illumination light emitted from a light source to illuminate the object.

With this construction, the object light rays incident on the close-up optical system form the primary images having predetermined parallax at the field stops through the zoom optical systems. The close-up optical system is adjusted so that the front focal point thereof coincides with the object. Thus, the close-up optical system has a function of a collimator lens that converts the divergent light rays from the object into the parallel light rays. The primary images are transmitted by the relay optical systems. The inter-axis distance reducing element reduces the inter-axis distance of the right and left light rays. The primary images are re-imaged by the relay optical systems as the secondary images on the adjacent regions on the single image taking surface of the image taking device, respectively. The captured images are displayed on a display device such as an LCD panel or a CRT. The lead surgeon and the other stuffs can observe the magnified stereoscopic images on the display devices through stereoscopic viewers.

For taking color images, the image taking device may adopt a single color CCD or may adopt a combination of a plurality of CCDs and chromatic beamsplitters. When a plurality of CCDs are used, the right and left images are formed on the adjacent regions of the respective CCD.

The diameter of the close-up optical system is preferably set to be larger than the diameter of a circle that includes the maximum effective diameters of the zoom optical systems and the maximum effective diameter of the illuminating optical system. Further, each lens of the close-up optical system may have a semicircular shape in which one side is cut out. In such a case, the illuminating optical system may be arranged in the cutout space of the close-up optical system.

Still further, the close-up optical system preferably includes a first lens group of a negative refractive power and a second lens group of a positive refractive power arranged in that order from the object side. In such a case, the second lens group may be movable along the optical axis direction for focusing according to the object distance.

The close-up optical system preferably satisfies the following condition (1) in order to reduce spherical aberration.

$$f_A > 500 \tag{1}$$

where $f_A$ is a focal length (unit: mm) of the close-up optical system. When the focal length of the close-up optical system is variable, the focal length $f_A$ is defined as the longest focal length.

A plane that includes optical axes of the zoom optical systems is preferably offset in parallel from a meridional plane of the close-up optical system. Further, it is preferable that each of the zoom lens systems includes first, second, third and fourth lens groups of positive, negative, negative and positive refractive powers, respectively, in that order from the side of the close-up optical system. In such a case, the second and third lens groups move for zooming along the optical axis direction while keeping the first and fourth lens groups at constant positions.

Each of the relay optical systems may include first, second and third lens groups of positive refractive powers, respectively. The first and second lens groups collimate the divergent light passing through the field stops in combination and the third lens group converges the parallel light rays exited from the second lens group. Furthermore, an aperture stop may be located between the second lens group and the third lens group of the relay optical system.

The relay optical systems preferably satisfy the following condition (2) in order to reduce the total size and weight of the microscope.

$$-3 < M_R < -1 \tag{2}$$

where $M_R$ is imaging magnification of the relay optical systems.

The inter-axis reducing optical element may include a pair of optical axis shifting prisms (offset prisms). In such a case, each of the optical axis shifting prisms being provided with incident and exit surfaces that are parallel to each other and first and second internal reflecting surfaces that are parallel to each other.

The illuminating optical system is preferably provided with an illumination lens for projecting the illumination light emitted from the light source and a wedge prism for deflecting the illumination light to coincide the illuminating region with the image taking region.

BRIEF DESCRIPTION OF DRAWINGS

The invention will be described below in detail with reference to the accompanying drawing, in which.

DESCRIPTION OF THE PREFERRED EMBODIMENT

The preferred embodiments of the present invention will now be described in detail below with reference to the accompanying drawings.

A video-type stereoscopic microscope (hereafter referred to as "stereoscopic microscope" for simplicity) according to the present embodiment is incorporated in a surgical operation supporting system that is used in cerebral surgical operations, for example. In this surgical operation supporting system, the three-dimensional image (stereovision image) of a tissue of a patient, which is taken by a stereoscopic microscope, is combined with CG (Computer Graphic) images, which is created from data about a diseased part in the tissue, in advance. The combined image is displayed on a stereoscopic viewer for a lead surgeon and on monitors for other staffs, and simultaneously recorded by a recording device.

The Overall Configuration of the Surgical Operation Supporting System

Figure 1:
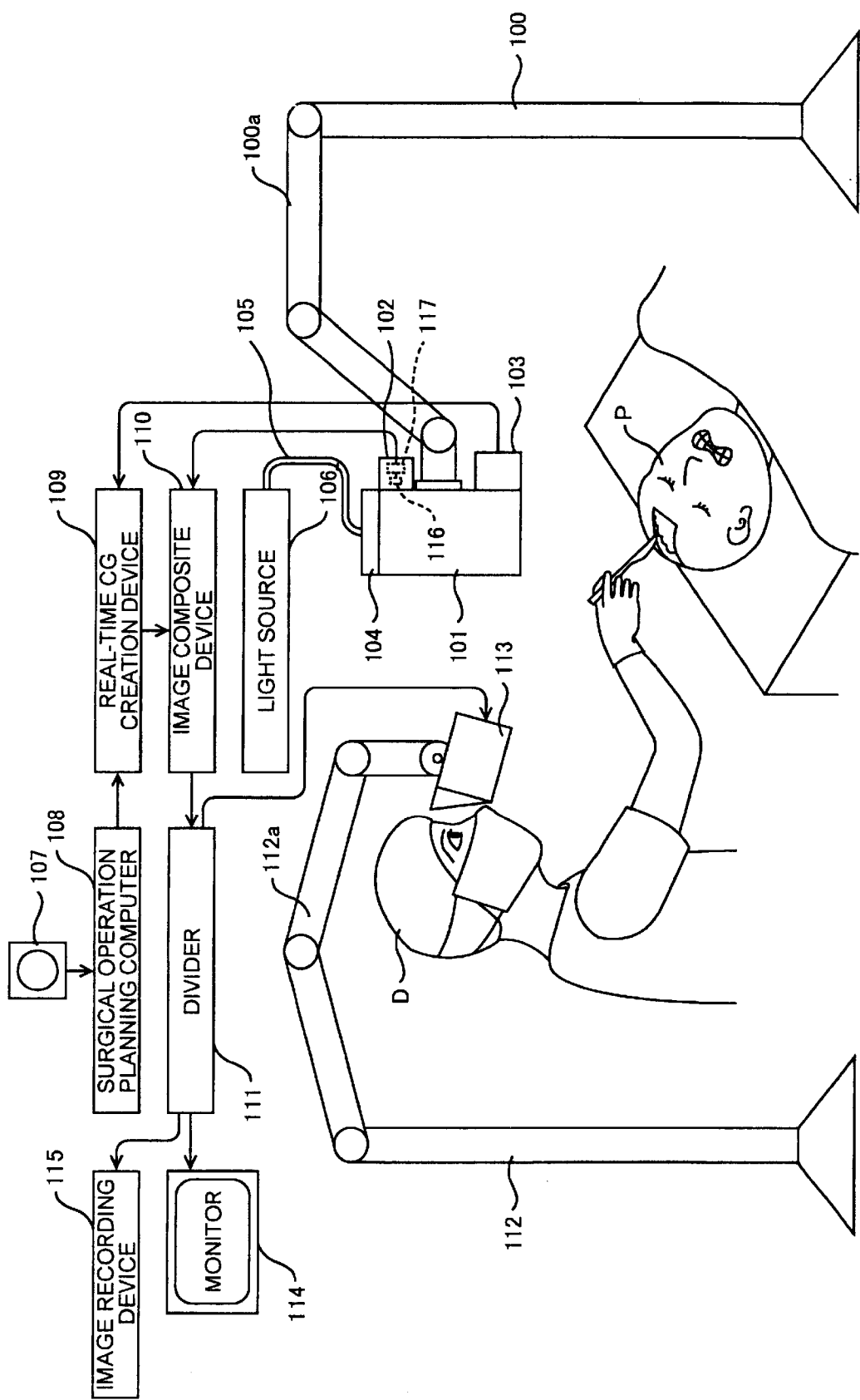
FIG. 1 is a schematic view showing an overall construction of a surge support system equipped with a video-type stereoseopic microscope according to a preferred embodiment of the present invention.

FIG. 1 schematically shows an arrangement of the surgical operation supporting system. As shown in this figure, the surgical operation supporting system is composed of a stereoscopic microscope 101, a high definition CCD camera 102 attached on the upper end of the back surface of the stereoscopic microscope 101, a microscope position measurement device 103 attached on the lower end of the back surface of the stereoscopic microscope 101, a counter weight 104 attached on the top of the stereoscopic microscope 101, a light guide fiber bundle 105 inserted into the interior of the stereoscopic microscope 101 through a center hole made in the counter weight 104, a light source 106 emitting illumination light to be introduced into stereoscopic microscope 101 through the light guide fiber bundle 105, a surgical operation planning computer 108 having a disk device 107, a real-time CG creation device 109 connected to the microscope position measurement device 103 and to the surgical operation planning computer 108, an image composite device 110 connected to this real-time CG creation device 109 and the high definition CCD camera 102, a divider 111 connected to the image composite device 110, an image recording device 115, and a monitor 114 and a stereoscopic viewer 113 which are connected to the divider 111.

The disk device 107 stores image data, such as CT scan image data, MRI image data, SPECT image data, blood flow field image data, that have been obtained through various detecting process with respect to a diseased part of a patient P. The disc device 107 also stores three-dimensional graphic data of the diseased part and its surrounding tissues, which have been created based on the various kinds of image data in advance. The three-dimensional graphic data represents shape, size and position of the diseased part and its surrounding tissues in a three-dimensional local coordinate system that is defined with a predetermined reference point set on the outer skin or surface of internal tissues of the patient as origin, in accordance with vector format or map format.

The stereoscopic microscope 101 has a mount on its back surface and is detachably fixed to the distal end of a free arm 100a of a first stand 100 through the mount. Thus, the stereoscopic microscope 101 can be moved within the space where the free arm 100a of the first stand 100 can reach, and can also be inclined in an arbitrary direction. Hereinafter, the object side (that is, patient side) relative to the stereoscopic microscope 101 will be defined as "low", and the opposite side as "high", so that understanding thereof may be easy.

Since the optical configuration in this stereoscopic microscope 101 will be explained in detail later, only its schematics thereof will be explained here.

Figure 2:
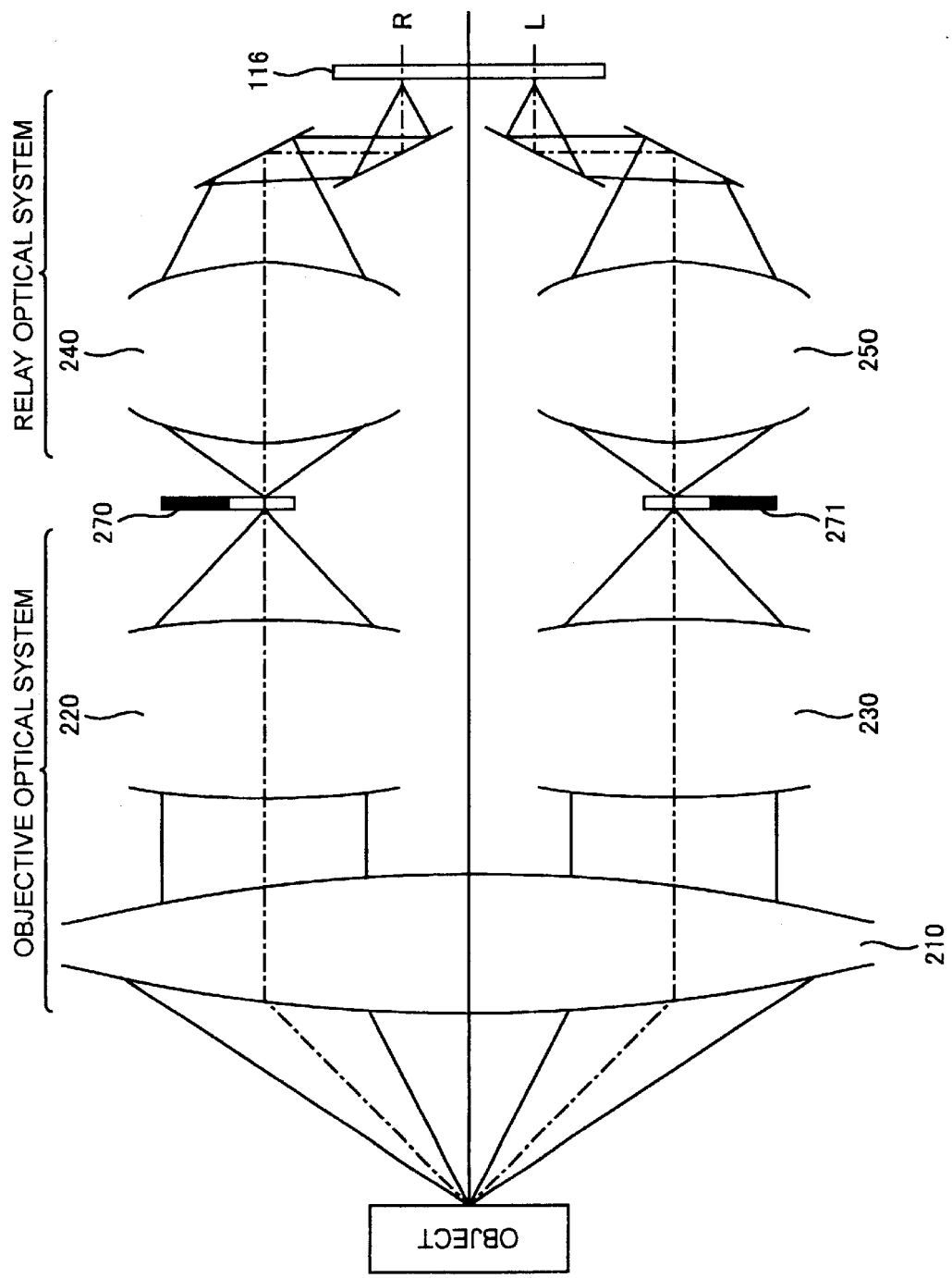
FIG. 2 is a schematic view showing an optical construction in the video-type stereoscopic microscope.

As shown in FIG. 2, primary images of an object are formed as aerial images at respective positions of right and left field stops 270, 271 through an object optical systems including a large-diameter close-up optical system 210 having a single optical axis and a pair of right and left zoom optical systems 220, 230, which respectively focus light rays that have passed through different portions of the close-up optical system 210. A pair of right and left relay optical systems 240, 250 relay the right and left primary images to from right and left secondary images on the right and left image taking regions in an image taking surface of a CCD 116 mounted in the high definition CCD camera 102, respectively. Each of the image taking regions has a vertical to horizontal aspect ratio of 9:8, while the image taking surface of the CCD 116 has a "high definition" size of which aspect ratio of vertical to horizontal is 9:16.

The close-up optical system 210, the right zoom optical system 220, and the right relay optical system 240 together constitute a right image taking optical system. The close-up optical system 210, the left zoom optical system 230, and the left relay optical system 250 together constitute the left image taking optical system. The close-up optical system 210 is common to the right and left image taking optical systems. The right and left zoom optical systems 220, 230 and the right and left relay optical systems 240, 250 are arranged with a predetermined base length therebetween.

The images which are thus formed on the right and left image taking regions of the image taking surface of the CCD 116 through the pair of image taking optical systems are equivalent to stereovision images including a pair of images taken from two locations which are separated from each other by the predetermined base length, which are arranged side by side. An output signal from this CCD 116 is converted to a high definition video signal by the image processor 117, and is outputted from the high definition CCD camera 102 to the image composite device 110.

The stereoscopic microscope 101 contains an illuminating optical system 300 (see FIG. 6) for illuminating the object that is located in the vicinity of the focal point of the close-up optical system 210. Illuminating light from the light source 106 is introduced into this illuminating optical system 300 via the light guide fiber bundle 105.

Returning to FIG. 1, the microscope positioning measurement device 103 measures the distance to the object that exists on the optical axis of the close-up optical system 210, the three-dimensional orientation of the optical axis of the close-up optical system 210, and the position of the above-mentioned reference point. The microscope positioning measurement device 103 then calculates the position of the object in the above-mentioned local coordinate system based upon these measurements. The information about the orientation of the optical axis and the position of the object is sent to the real-time CG creation device 109.

This real-time CG creation device 109 creates real-time CG images, such as wire frame images, of a diseased part such as a tumor based on the information about the orientation of the optical axis and the position of the object which are sent from the microscope position measurement device 103, and based on the three-dimensional data down-loaded from the operation planning computer 108. These CG images are so created that they are equivalent to the stereoscopic images as viewed along the optical axis direction with the same base length and the same distance as those of the optical system of the stereoscopic microscope 101. The real-time CG creation device 109 outputs CG image signals representing the created CG images to the image composite device 110, one after another.

This image composite device 110 superimposes the CG image signals obtained by the real-time CG creation device 109 onto the high definition video signal of the actual object, which is inputted from the high definition CCD camera 102, with appropriately adjusting its scale. In the image represented by the high definition video signal superimposed with the CG image signal, the shape, size and the position of the diseased part are indicated as CG images (such as wire frame images) on the real image thereof. The thus superimposed high definition video signals are divided by the divider 111, and are supplied to the stereoscopic viewer 113 for a lead surgeon D, to the monitor 114 for other surgical staffs or an advisor at a remote location, and to the recording device 115, respectively.

The stereoscopic viewer 113 is attached to the distal end of a free arm 112a of a second stand 112 in the downward direction, so that the stereoscopic viewer 113 can be suitably positioned in accordance with a posture of the lead surgeon D that facilitates his/her operations. The schematic structure of this stereoscopic viewer 113 is shown in FIG. 3.

Figure 3:
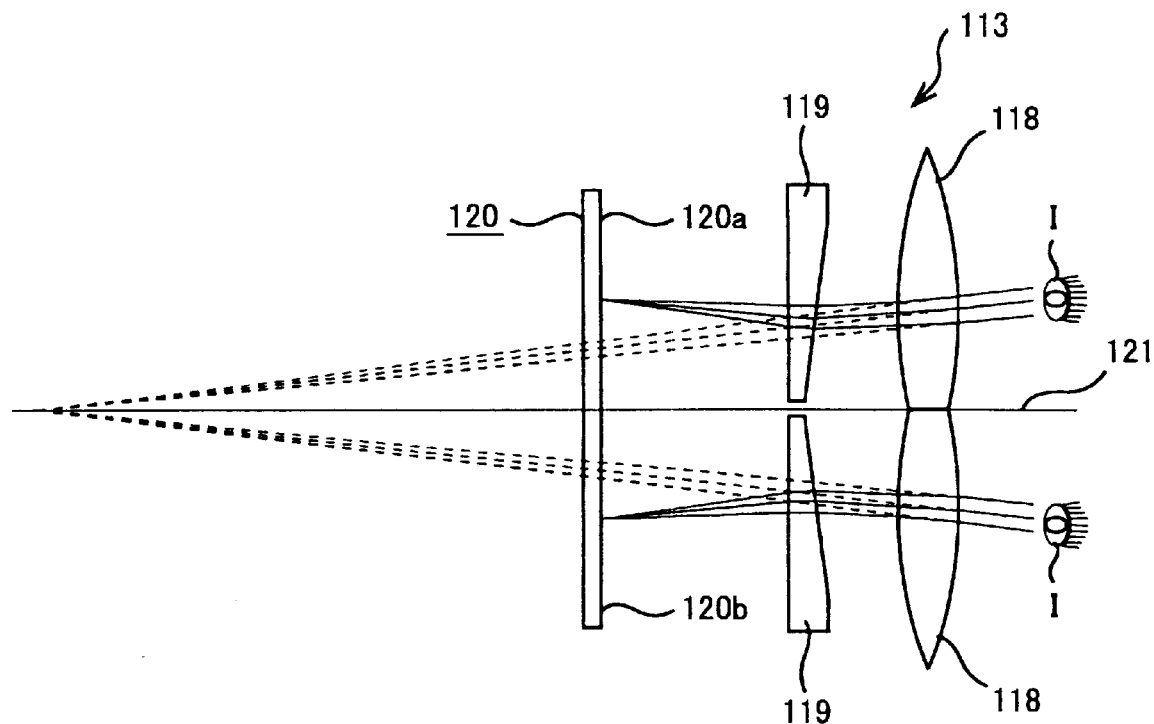
FIG. 3 is a schematic view showing an optical construction of a video-type stereoscopic viewer.
Figure 4:
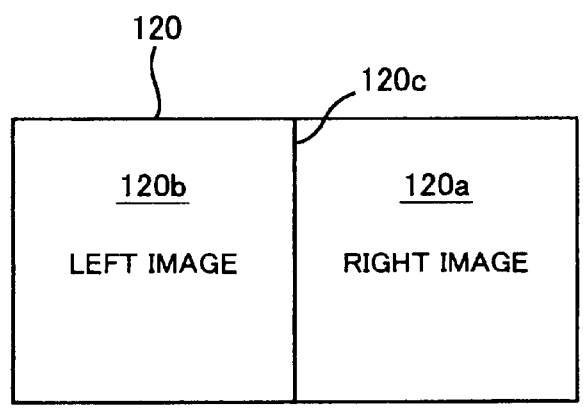
FIG. 4 is a plan view of an LCD panel.

As shown in the FIG. 3, the stereoscopic viewer 113 contains a high-definition-sized LCD panel 120 having an aspect ratio of 9:16 as a monitor. When the high definition video signal from the divider 111 is inputted into the LCD panel 120, as shown in the plan view of FIG. 4, the left half 120b of the LCD panel 120 displays the image taken by the left image taking region of CCD 116, and the right half 120a thereof displays the image taken by the right image taking region of CCD 116. A boundary 120c of these right and left images may be shifted or tilted depending upon adjustment of field stops 270, 271, which will be explained later.

The light paths in the stereoscopic viewer 113 are divided into the right and the left by a partition 121, which is installed along a direction perpendicular to the LCD panel 120 at the boundary 120c which emerges when the field stops 270, 271 are properly adjusted. At each side of the partition 121, a wedge prism 119 and an eyepiece 118 are disposed in that order from the side of LCD panel 120. The eyepiece 118 forms a magnified virtual image of the image displayed on the LCD panel 120 at a position that is located 1 m (−1 diopter) in front of observing eyes I. The wedge prism 119 adjusts the direction of the light such that the angle of convergence of the observing eyes I may correspond to that in case of observing an object placed 1 m in front of the eye I naked, thereby enabling natural three-dimensional observation.

As described above, the images obtained by the stereoscopic microscope 101 are superimposed with CG image such as a wire frame, which is created based upon images taken by various image-taking devices in advance, in order to show the shape, size, and the position of the diseased part. The superimposed images are viewed as three-dimensional images through the stereoscopic viewer 113 and displayed by the monitor 114. Accordingly, the lead surgeon D and other surgical staffs who are observing these images can easily identify the diseased part, which would be difficult to be identified with actual images only. Thus, the surgical operations can be conducted in a fast and accurate manner.

The Configuration of the Stereoscopic Microscope

Figure 5:
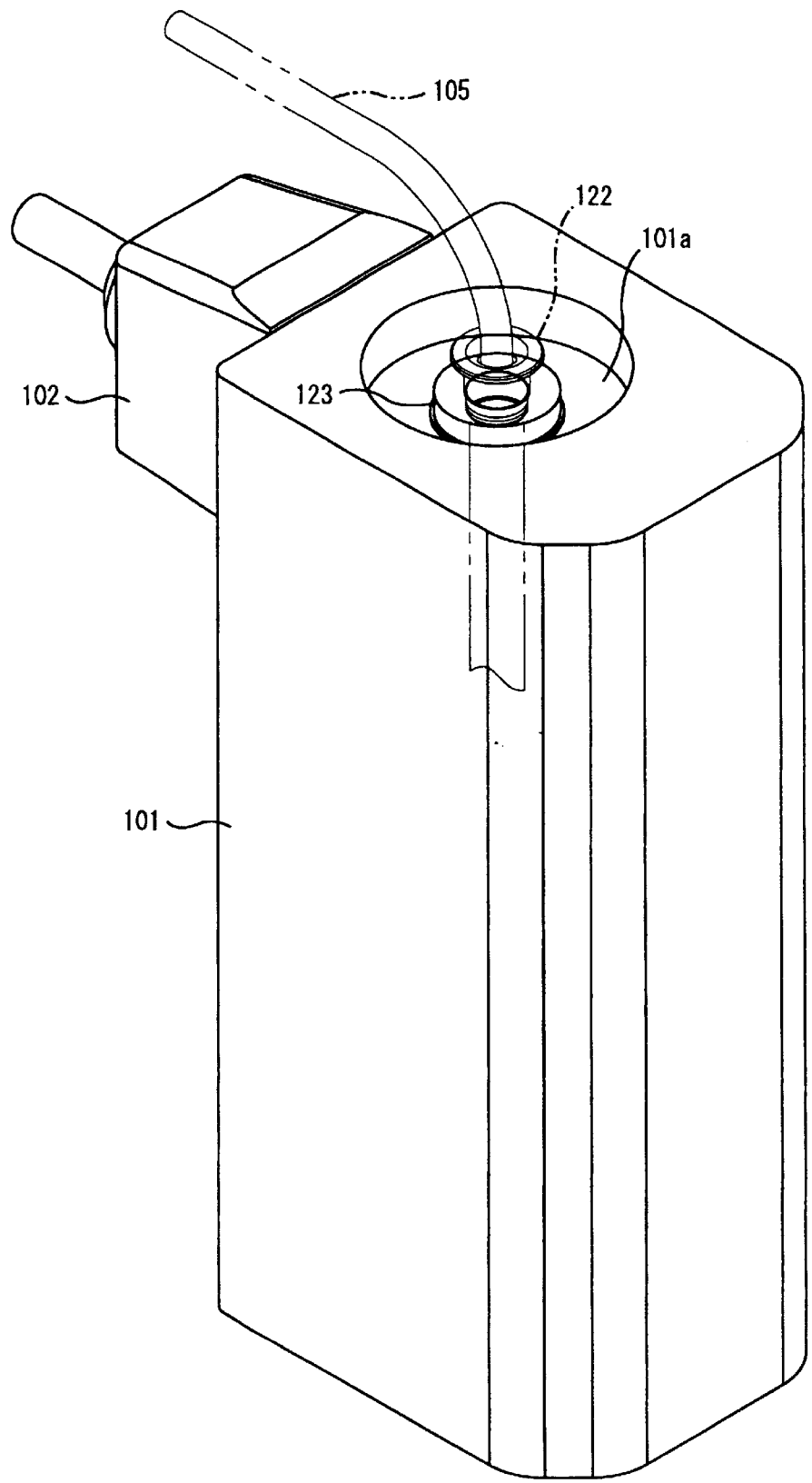
FIG. 5 is a perspective view showing an outer appearance of the stereoscopic microscope.

The structure of the above-mentioned stereoscopic microscope 101 (including the high definition CCD camera 102) is explained in more detail. As shown in FIG. 5, this stereoscopic microscope 101 has a shape of substantially polygonal column. The back surface of the stereoscopic microscope 101 is flat and is attached with the high definition CCD camera 102, and the front surface (that is, the opposite side of the back surface) has chamfered edges on both sides. At the center of the top surface, a circular recess 101a is formed. At the center of the recess 101a, an insertion opening (not illustrated) is bored so as to be inserted with a guide pipe 122, which is a cylindrical member fixedly covering the distal end of the light guide fiber bundle 105. Here, an annular-shaped member (that is, fiber guide insertion part) 123 attached to the insertion opening is a chuck for fixing the guide pipe 122 inserted into the insertion opening.

Optical Configuration

Figure 6:
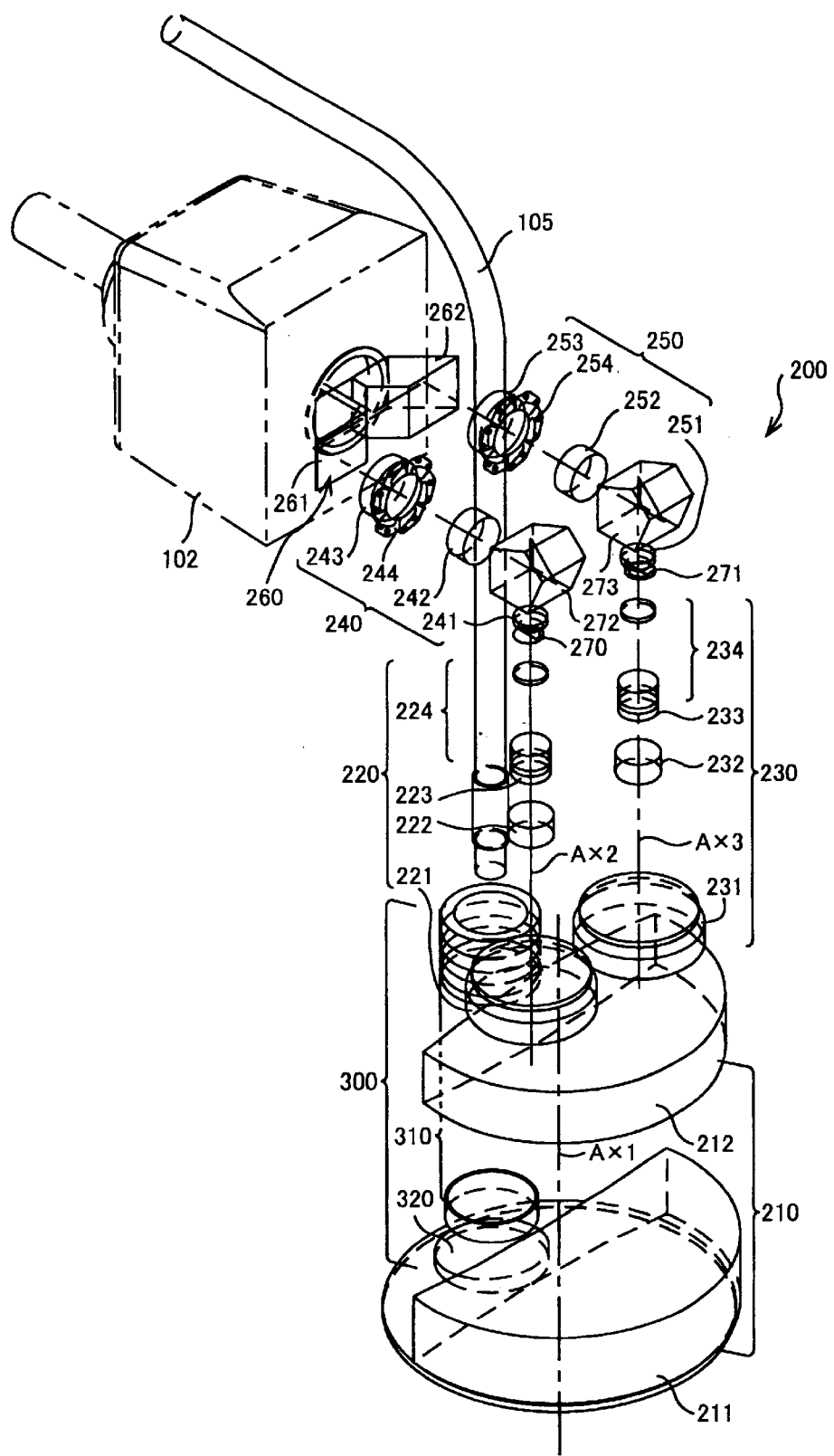
FIG. 6 is a perspective view showing an overall construction of a microscope optical system.
Figure 7:
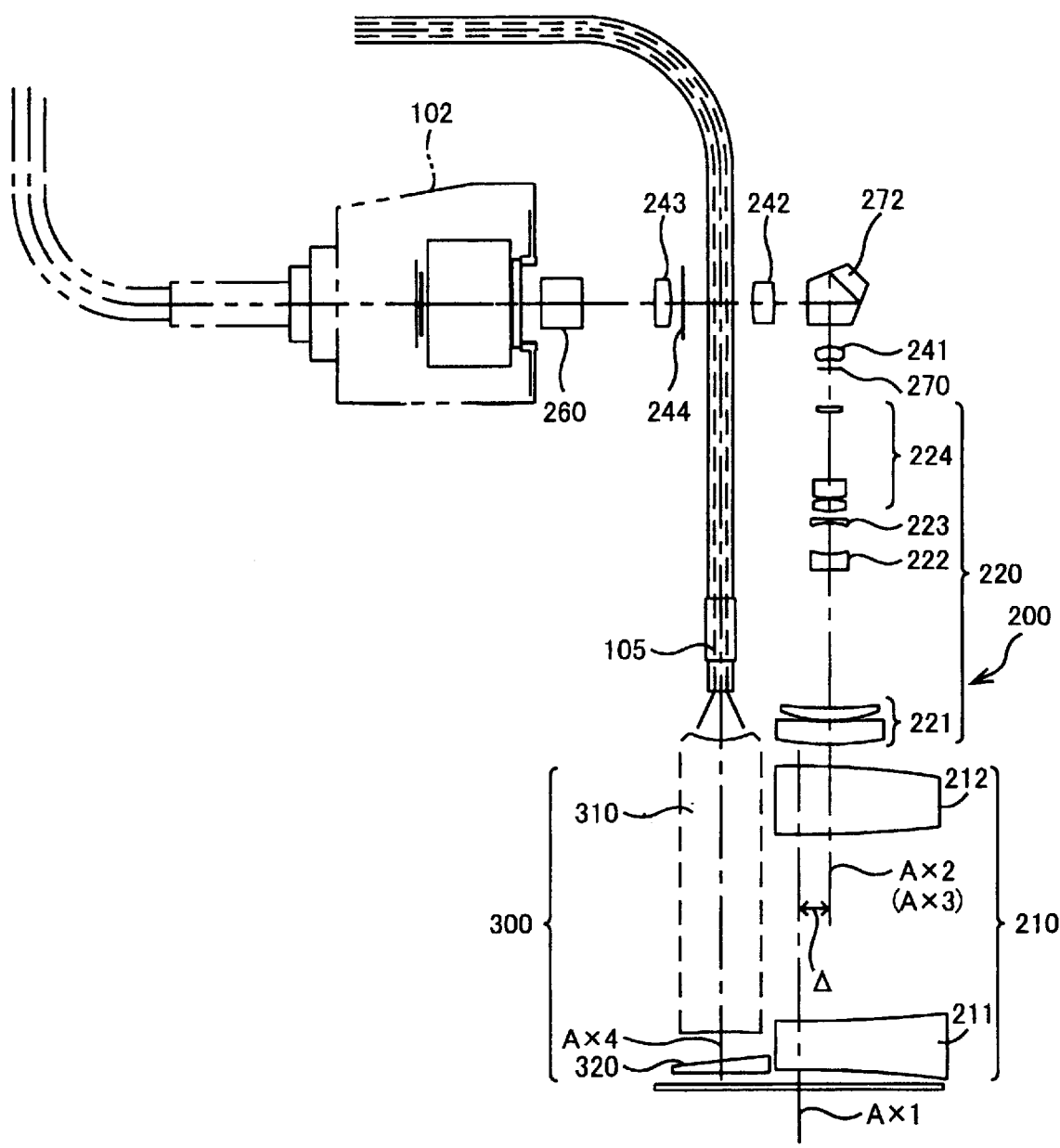
FIG. 7 is a side view showing an overall construction of the microscope optical system.
Figure 8:
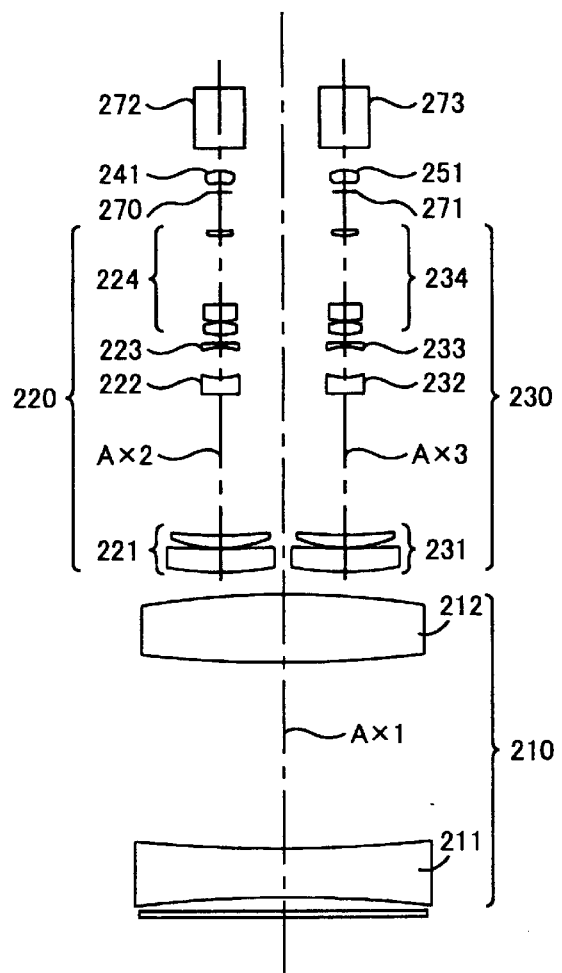
FIG. 8 is a front view showing an overall construction of the microscope optical system.
Figure 9:
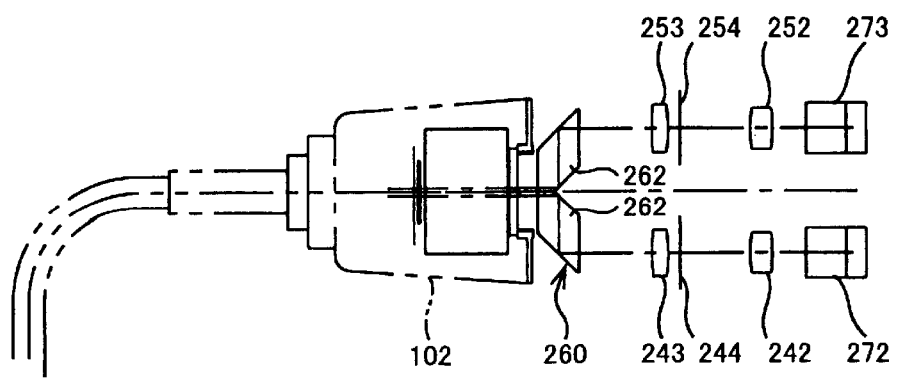
FIG. 9 is a plan view showing an overall construction of the microscope optical system.

Next, the optical configuration of the stereoscopic microscope 101 will be explained with reference to FIGS. 6 to 9. FIG. 6 is a perspective view of an overall structure of the microscopic optical system; FIG. 7 is a side view; FIG. 8 is a front view; and FIG. 9 is a plan view of the microscopic optical system.

As shown in FIG. 6, the microscopic optical system includes an image taking optical system (a pair of right and left image taking optical systems) 200 for electrically taking an image of an object, and an illuminating optical system 300 for illuminating the object with illuminating light guided from the light source 106 through the light guide fiber bundle 105.

The image taking optical system 200 includes an objective optical system, which includes a common close-up optical system 210 and a pair of right and left zoom optical systems 220, 230, for forming the primary images of the object; a pair of right and left relay optical systems 240, 250 for forming the secondary images by relaying the primary images; and an inter-axis distance reducing prism 260 as an inter-axis distance reducing element that brings the object light rays from the relay optical systems 240, 250 close to each other.

Also, at the positions where the primary images are formed by the zoom optical systems 220, 230, field stops 270, 271 are respectively disposed. In the relay optical systems 240, 250, pentagonal prisms 272, 273 are placed as optical path deflecting elements for deflecting the respective light paths at the right angle.

According to this construction, right and left images with a predetermined parallax can be formed on adjacent two regions of the CCD 116 installed in the CCD camera 102. Here, in the following explanations of optical systems, a "horizontal direction" is the direction that coincides with the longitudinal direction of the image taking surface of the CCD 116 when images are projected thereon, and a "vertical direction" is the direction that is perpendicular to the horizontal direction relative to the CCD 116.

Each of the optical systems will be explained hereinafter.

As shown in FIGS. 6, 7 and 8, the close-up optical system 210 includes a first lens 211 of a negative refractive power, and a second lens 212 of a positive refractive power arranged in that order from the object side. The second lens 212 moves along the optical axis direction for focusing in accordance with the object distance.

That is, since the second lens 212 is adjusted so that an object is placed at the object-side focal point of the close-up optical system 210, the close-up optical system 210 behaves like a collimator lens to convert divergent light from the object into substantially parallel light.

The plane shape of each of the first and second lenses 211, 212 of the close-up optical system 210, as viewed from the zoom optical systems 220 and 230, is a semicircular shape in which one side is cut out (D-cut). The illuminating optical system 300 is disposed at the cutout portions.

A pair of zoom optical systems 220, 230 focus afocal object light from the close-up optical system 210 at the positions of the field stops 270, 271, respectively.

As shown in FIGS. 6 to 8, the right zoom optical system 220 includes first through fourth lens groups 221, 222, 223 and 224 of positive, negative, negative and positive refractive powers, respectively, in that order from the side of the close-up optical system 210. The first and fourth lens groups 221, 224 are fixed, and the second and third lens groups 222, 223 move for zooming along the optical axis direction. The second lens group 222 moves mainly to change the magnification, and the third lens group 223 moves to maintain the focal position.

Like the right zoom optical system 220, the left zoom optical system 230 includes the first through fourth lens groups 231, 232,233, and 234. The right and left zoom optical systems 220, 230 are interlocked by a driving mechanism (not shown in the figures), whereby the magnifications of the right and left images can be changed simultaneously.

The optical axes Ax2, Ax3 of the zoom optical systems 220, 230 are in parallel with the optical axis Ax1 of the close-up optical system 210. A first plane that includes these optical axes Ax2, Ax3 of the zoom optical systems 220, 230 is off set from a second plane, which is parallel to the first plane and includes the optical axis of the close-up optical system 210, by a distance A at the opposite side of the D-cut portion.

The diameter of the close-up optical system 210 is set to be larger than the diameter of a circle that includes the maximum effective diameters of the zoom optical systems 220, 230 and the maximum effective diameter of the illuminating optical system 300. As described above, since the optical axes Ax2, Ax3 of the zoom optical systems 220, 230 are positioned oppositely to the D-cut portion with respect to the optical axis Ax1, the illuminating optical system 300 can be placed inside of a circular region defined by the diameter of the close-up optical system 210, thereby enabling a compact overall construction.

Furthermore, the separate construction between the close-up optical system 210 and the pair of right and left zoom optical systems 220, 230 enables to simplify the adjusting mechanism and the optical design while keeping a long working distance (the distance from the object to the nearest surface of the close-up optical system 210) and a high zoom ratio. Namely, since the close-up optical system 210 is shared between the right and left images, the movement of the single lens adjusts the focuses of the right and left images, which simplifies the focus adjusting mechanism. Further, the close-up optical system 210 only collimates the object light and each of the right and left zoom optical systems 220, 230 only forms the primary image when the parallel light is incident thereon, which simplifies the lens design of each of the optical systems. Since the four-group zoom lens has a high zoom ratio while keeping a constant entire length, it is preferable to be used as an intermediate optical system among the plurality of optical systems.

The field stops 270, 271 are disposed on design positions at which the primary images are to be formed by the zoom optical systems 220, 230 having designed performance. As shown in FIG. 6, each of the field stops 270, 271 has a circular outline shape, and have a semi-circular aperture concentric with circular outline on the inner side in the horizontal direction. The field stops 270, 271 are disposed such that the straight edges of these apertures coincide with the vertical direction corresponding to the boarder line of the right and left images on the CCD 116, and such that only the inner parts of light flux can be transmitted.

The microscope according to the present embodiment needs to avoid overlapping of the right and left images on the CCD 116 in order to form the right and left secondary images on adjacent regions of the single CCD 116. Therefore, the field stops 270, 271 are placed at the position of the respective primary images. The straight-line edge of the semi-circular shaped aperture of each of those field stops 270, 271 functions as a knife-edge, so that only light rays traveling inside the edge can pass through the field stop 270,271. The primary images formed on the field stops 270, 271 are re-imaged through the right and left relay optical systems 240, 250 as secondary images. The resultant secondary images are reversed in the horizontal direction and in the vertical direction with respect to the primary images. Thus, the knife edges defining the outside edges in the horizontal direction at the positions of the primary images define the inside edges in the horizontal directions at the positions of the secondary images, which clearly defines the boundary of the right and left images.

The relay optical systems 240, 250 includes three lens groups of positive refractive powers, respectively. As shown in FIGS. 6 and 7, the right relay optical system 240 includes a first lens group 241 composed of a single positive meniscus lens, a second lens group 242 having a positive refractive power as a whole, and a third lens group 243 composed of a single biconvex lens. The object side focal point of the combination of the first and second lens groups 241 and 242 is coincident with the image forming plane of the primary image formed by the zoom optical system 220. That is the same position as the field stop 271. The third lens group 243 converges parallel light transmitted from the second lens group 242 onto the image taking surface of the CCD 116. Between the first lens group 241 and the second lens group 242, the pentagonal prism 272 is disposed for deflecting the light path at the right angle. Between the second lens group 242 and the third lens group 243, an aperture stop 244 is installed for adjusting the light amount.

Like the right relay optical system 240, the left relay optical system 250 includes the first, second and third lens groups 251, 252 and 253. The pentagonal prism 273 is disposed between the first lens group 251 and the second lens group 252, and an aperture stop 254 is installed between the second lens group 252 and the third lens group 253.

The divergent light that has passed through the field stops 270, 271 is converted to substantially parallel light through the first lens groups 241, 251 and the second lens groups 242, 252 of the relay optical systems. After passing through the aperture stops 244, 254, the light rays are re-converged through the third lens groups 243, 253 to form the secondary images.

Since the pentagonal prisms 272, 273 are disposed inside the relay optical systems 240, 250, the total length of the image taking optical system 200 along the optical axis Ax1 of the close-up optical system 210 can be shortened. Further, if a mirror is used as the optical path deflecting element, a setting angle error of the mirror largely deviates the direction of the reflected light. On the other hand, the pentagonal prism keeps the direction of the reflected light when it rotates around an axis that is perpendicular to a plane including the optical axis of the zoom optical system before and after the deflection by the pentagonal prism.

Further, the second lens groups 243, 252 and the third lens groups 243, 253 in the relay optical systems 240, 250 are adjustable in the direction of the optical axis and in the direction perpendicular to the optical axis. When the second and third lens groups 242, 252, 243, 253 move along the optical axis direction, the resultant focal lengths of the first and second lens groups vary, which changes the magnification (the image height of the secondary images) of the relay optical systems 240, 250. Furthermore, adjustments of the third lens groups 243, 253 along the optical axis direction change the position of the secondary images along the optical axis, which enables the focus adjustment with respect to the CCD 116. In addition, when the second lens groups 242, 252 and the third lens groups 253, 253 are adjusted as a unit in a direction perpendicular to the optical axis, the positions of the secondary images are adjusted in a plane perpendicular to the optical axis.

For such adjustments, the second lens group 242 and the third lens group 243 in the right relay optical system 240 are held in a unitary outer lens barrel, and the third lens group 243 is further held in an inner lens barrel, which is movable relative to the outer lens barrel in the direction of the optical axis. In the same manner, the second lens group 252 and the third lens group 253 in the left relay optical system 250 are held in an outer lens barrel and the third lens group 253 is further held in an inner lens barrel.

Since the second lens groups 242, 252 and the third lens groups 243, 253 are movable in this matter for enabling various adjustments, if the pentagonal prisms 272, 273 were placed between these lens groups, the adjustment mechanism would become more complex. Therefore, it is preferable to place the pentagonal prisms 272, 273 between the field stops 270, 271 and the second lens groups 242, 252. Moreover, since the degree of divergence of the object light is reduced by the first lens groups 241, 251, the pentagonal prisms 272, 273 are preferably placed between the first lens groups 241, 251 and the second lens groups 242, 252 in order to make the effective diameter of the pentagonal prisms smaller.

The inter-axis distance reducing prism 260 is disposed between the relay optical systems 240, 250 and the CCD camera 102 to reduce the distance between the right and left object light rays from the respective relay optical systems 240, 250. To attain real stereoscopic feeling by the stereoscopic observation, it is necessary to have a predetermined base length between the right and left zoom optical systems 220, 230 and between the right and left relay optical systems 240, 250. On the other hand, to form secondary images on the adjacent regions on the CCD 116, it is necessary to shorten the distance between the optical axes than the base length. The inter-axis distance reducing prism 260 brings the optical axes of the relay optical systems close to each other, which enables to form secondary images on the same CCD 116 while keeping the predetermined base length.

As shown in FIGS. 6 and 9, the inter-axis distance reducing prism 260 includes a pair of optical axis shifting prisms 261, 262 having shapes of the pentagonal columns, which are symmetric to each other. The prisms 261, 262 are arranged in a right and left symmetric configuration with a spacing of about 0.1 mm therebetween.

As shown in FIG. 9, each of the optical axis shifting prisms 261, 262 has incident and exit surfaces that are parallel to each other, and has first and second reflecting surfaces in the respective outer side and inner side, which are also parallel to each other. Viewed in the direction parallel to the incident and exit surfaces and reflecting surfaces, these optical axis shifting prisms 261, 262 have a pentagonal shape formed by cutting out an acute-angle corner of a parallelogram with a line perpendicular to the exit surface. The optical axis shifting prisms 261, 262 may be replaced by a pair of separated mirrors. Nevertheless, the prism having two internal reflecting surfaces is used in the embodiment, so that the positional relationship between the two reflecting surfaces is fixed, which eases the adjustment as compared with a use of a pair of separated mirrors.

The object lights from the relay optical systems 240, 250 are incident on the incident surfaces of the respective optical axis shifting prisms 261, 262; internally reflected by the outer reflecting surfaces so as to be directed in right-to-left direction; internally reflected by the inner reflecting surfaces so as to be directed to the optical axis directions that are the same as the incident direction; and are exited from the exit surfaces so as to be incident on the CCD camera 102. As a result, the distance between the right and left object light rays is narrowed without altering the traveling directions, and the secondary images are formed on the single CCD 116.

The illuminating optical system 300 has the function of projecting illumination light onto the object, and, as shown in FIG. 6 and FIG. 7, includes an illuminating lens 310 for adjusting the degree of divergence of divergent light emitted from the light guide fiber bundle 105 and a wedge prism 320 for deflecting the illumination light to coincide the illuminating region with the image taking region. As shown in FIG. 7, the optical axis Ax4 of the illuminating lens 310 is parallel to the optical axis Ax1 of the close-up optical system 210, and is offset from the optical axis Ax1 by a predetermined amount. Therefore, if the wedge prism 320 is not disposed, the center of the illuminating region would not coincide with the center of the image taking region, which wastes some amount of illuminating light. The wedge prism 310 matches the illuminating region with the image taking region, which enables effective use of the illuminating light.

More details concerning the image taking optical system 200 will be described.

The CCD camera 102 of the embodiment is a four-chip color camera that simultaneously captures a red image, a blue image and green images formed on four CCD chips through an arrangement of prisms that act as chromatic beamsplitters. Each CCD has a size of ⅓ inches in an HDTV (high-definition TV) standard. That is, it has a size of 4.85 mm×2.78 mm that is separated into right and left regions. The distance between the centers of the right and left regions is 2.425 mm, and the pixel size is 2.53 $\mu$m×2.78 $\mu$m.

Sensitivity of the CCD decreases as the pixel size is reduced. Since the image taking optical system 200 adopts the high resolution compact CCD as mentioned above, small F-numbers are required for the zoom optical systems 220, 230 and the relay optical systems 240, 250 in order to compensate reduction of sensitivity with capturing high resolution images. The zoom optical systems 220, 230 have focal length of 12 mm through 120 mm and F-number of 4. Further, the maximum diameter of each of the zoom optical systems is 33 mm, and the inter-axis distance is 40 mm to avoid mechanical interference therebetween. The diameter of the c lose-up optical system 210 is 91 mm.

Since the close-up optical system 210 has such a large diameter, it is necessary to reduce the sphereical aberration.

The spherical aberration of the close-up optical system 210 is rotationally symmetrical with respect to the optical axis Ax1 of the close-up optical system 210, while it becomes rotationally asymmetrical aberrations with respect to the optical axes Ax2 and Ax3 of the zoom optical systems 220 and 230. Therefore, if the close-up optical system 210 is not well corrected in the spherical aberration, astigmatisms occur in the images formed through the zoom optical systems 220 and 230. Particularly, when the object goes out of focus, the point image becomes asymmetrical with respect to the optical axis. In addition, since the regions taken by the right and left zoom optical systems 220 and 230 are symmetrical with respect to the diameter of the close-up optical system 210, the astigmatisms of the right and left images have the opposite directional properties.

The right and left images should have the same conditions other than the parallax in order to achieve a real stereoscopic view. For instance, when diffusion and/or distortion of the image due to aberrations have the same directional properties, it does not interfere with the stereoscopic observation significantly. However, if the aberrations have the opposite directional properties, the right and left images have different pictures in the specific part of the object, which significantly interferes with the stereoscopic observation.

The spherical aberration can be reduced using a large number of lenses, while it increases cost, weight and space of the close-up optical system.

On the other hand, the spherical aberration decreases as the focal length increases. Therefore, the close-up optical system 210 of the embodiment has a relatively long focal length to reduce spherical aberration with a small number of lenses. In the embodiment, the close-up optical system 210 satisfies the following condition (1);

$$f_A > 500 \tag{1}$$

where $f_A$ is a focal length (unit: mm) of the close-up optical system.

When the condition (1) is satisfied, the spherical aberration of the close-up optical system 210 can be reduced, which also reduces the astigmatisms occurred in the primary images, enabling good stereoscopic observation.

The image taking optical system 200 of the embodiment is specialized to the video-type stereoscopic microscope. If the microscope also serves as the observation by the naked eye, the zoom optical systems should have large magnification for the observation by the naked eye. However, the higher the magnification of the zoom optical system is, the longer the focal length thereof is, which enlarges the total size and weight of the microscope.

In the embodiment, the magnifications of the zoom optical systems 220, 230 are smaller than the microscope for the observation by the naked eye. On the other hand, the relay optical systems 240, 250 satisfy the following condition (2);

$$-3 < M_R < -1 \tag{2}$$

where $M_R$ is imaging magnification of the relay optical systems.

In general, the longer a focal length of a zoom lens is, the larger the total length, diameter and weight of the zoom lens are. Particularly, since the high resolution zoom lens such as a lens of the microscope consists of a large number of lenses, the total length and weight significantly increase as the focal length increases. Therefore, when the focal length of the zoom optical systems 220, 230 are sufficiently short, the total size and weight of the microscope can be reduced.

When the magnification $M_R$ is larger than −1, the focal length of the zoom optical system should be longer to obtain the predetermined total magnification of the microscope, which disturbs the reduction in size of the zoom optical systems. On the other hand, the magnification $M_R$ is smaller than −3, the focal length of the zoom lens at the wide extremity becomes too short, that is, the view angle becomes too large, to correct aberrations while keeping a predetermined zoom range. Further, the F-number of the first lens group of the relay optical system should decrease as the magnification of the relay optical system decreases, in order to keep the predetermined luminance on the CCD. Therefore, when the magnification $M_R$ is smaller than −3, the F-number of the first lens group becomes too small to correct aberrations.

When the microscope also serves as the observation by the naked eye, the video-type microscope is formed as a combination of a direct-view-type microscope and an image taking adapter that is attached to eyepieces of the microscope. The zoom optical systems are installed in the direct-view-type microscope, the relay optical systems and CCDs are installed in the adapter.

A design example of such a double use microscope will be compared with a design example of the specialized video-type microscope of the embodiment. As a precondition, the zoom ratio of the zoom optical system is 10 times and the secondary image is formed on the region of 2 mm×2 mm.

The absolute value of magnification of the zoom optical system should be larger in the double use type to keep sufficient magnification for the observation by the naked eye. On the other hand, the absolute value of magnification of the relay optical system may be small. For example, when the double use type microscope includes the zoom optical system whose F-number is 6 and focal length range is 16 mm through 180 mm and the relay optical system whose magnification is −1, the size of the optical systems are as follows.

|  | Total length | Maximum diameter |
|---|---|---|
| Zoom optical system | 230 mm | 58 mm |
| Relay optical system | 222 mm | 18 mm |

The absolute value of magnification of the zoom optical system may be smaller in the specialized video-type microscope. On the other hand, the absolute value of magnification of the relay optical system should be larger. For example, when the specialized video-type microscope includes the zoom optical system whose F-number is 4 and focal length range is 12 mm through 120 mm and the relay optical system whose magnification is −1.5, the size of the optical systems are as follows.

|  | Total length | Maximum diameter |
|---|---|---|
| Zoom optical system | 120 mm | 30 mm |
| Relay optical system | 199 mm | 14 mm |

The comparison indicates that the specialized video-type is advantageous to the compact design of the microscope.

Four concrete examples of the image taking optical system 200 will be described hereinafter.

FIRST EXAMPLE

Figure 10:
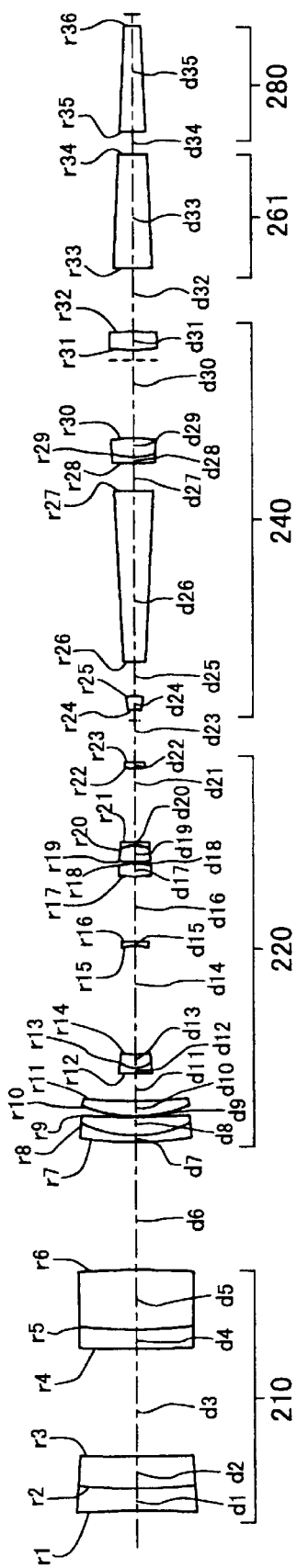
FIG. 10 is a development lens diagram of the image taking optical system according to a first example.

FIG. 10 shows the image taking optical system 200 of the first example in the developed fashion. The numerical constructions thereof are described in TABLE 1. The surface numbers 1 through 6 represent the close-up optical system 210, in which the surface numbers 1 through 3 represent the first lens group 211, the surface numbers 4 through 6 represent the second lens group 212. The surface numbers 7 through 23 represent the zoom optical system 220, in which the surface numbers 7 through 11 represent the first lens group 221, the surface numbers 12 through 14 represent the second lens group 222, the surface numbers 15 and 16 represent the third lens group 223 and the surface numbers 17 through 23 represent the fourth lens group 224. The surface numbers 24 through 32 represent the relay optical system 240, in which the surface numbers 24 and 25 represent the first lens group 241, the surface numbers 26 and 27 represent the pentagonal prism 272, the surface numbers 28 through 30 represent the second lens group 242 and the surface numbers 31 and 32 represent the third lens group 243. The surface numbers 33 and 34 represent the optical axis shifting prism 261, and the surface numbers 35 and 36 represent a chromatic beamsplitter 280 arranged in the CCD camera 102.

In TABLE 1, r (unit:mm) denotes a radius of curvature of a surface, d (unit:mm) denotes a distance between the surfaces along the optical axis, n denotes a refractive index at a wavelength 588 nm and vd denotes an Abbe number.

In the first example, the focal length of the close-up optical system 210 is variable in the range of 532.3 mm through 645.3 mm, and the imaging magnification $M_R$ of the relay optical systems 240, 250 is −1.5.

TABLE 1

| Surface Number | r | d | n | vd |
|---|---|---|---|---|
| 1 | −440.000 | 6.50 | 1.51633 | 64.1 |
| 2 | 164.547 | 9.20 | 1.62004 | 36.3 |
| 3 | 472.000 | 30.34 | | |
| 4 | 403.219 | 5.40 | 1.80518 | 25.4 |
| 5 | 141.500 | 16.50 | 1.67003 | 47.3 |
| 6 | −292.600 | 35.66 | | |
| 7 | 96.650 | 2.00 | 1.67270 | 32.1 |
| 8 | 32.889 | 5.50 | 1.61800 | 63.4 |
| 9 | 321.250 | 0.20 | | |
| 10 | 42.000 | 4.00 | 1.61800 | 63.4 |
| 11 | 154.980 | 8.11 | | |
| 12 | −199.500 | 1.50 | 1.83400 | 37.2 |
| 13 | 6.892 | 3.70 | 1.84666 | 23.8 |
| 14 | 18.878 | 30.42 | | |
| 15 | −15.142 | 1.20 | 1.48749 | 70.2 |
| 16 | ∞ | 18.30 | | |
| 17 | 19.083 | 3.80 | 1.49700 | 81.6 |
| 18 | −19.083 | 0.50 | | |
| 19 | 26.525 | 4.50 | 1.48749 | 70.2 |
| 20 | −11.258 | 1.00 | 1.83481 | 42.7 |
| 21 | −378.000 | 21.52 | | |
| 22 | 22.000 | 1.75 | 1.48749 | 70.2 |
| 23 | ∞ | 15.00 | | |
| 24 | −16.739 | 4.00 | 1.48749 | 70.2 |
| 25 | −9.260 | 10.00 | | |
| 26 | ∞ | 47.80 | 1.51633 | 64.1 |
| 27 | ∞ | 7.80 | | |
| 28 | 62.479 | 1.80 | 1.60342 | 38.0 |
| 29 | 19.431 | 5.20 | 1.49700 | 81.6 |
| 30 | −39.088 | 24.86 | | |
| 31 | 45.100 | 5.20 | 1.48749 | 70.2 |
| 32 | −134.343 | 17.84 | | |
| 33 | ∞ | 32.00 | 1.60311 | 60.7 |
| 34 | ∞ | 6.47 | | |
| 35 | ∞ | 29.87 | 1.51633 | 64.1 |
| 36 | ∞ | — | | |

SECOND EXAMPLE

Figure 11:
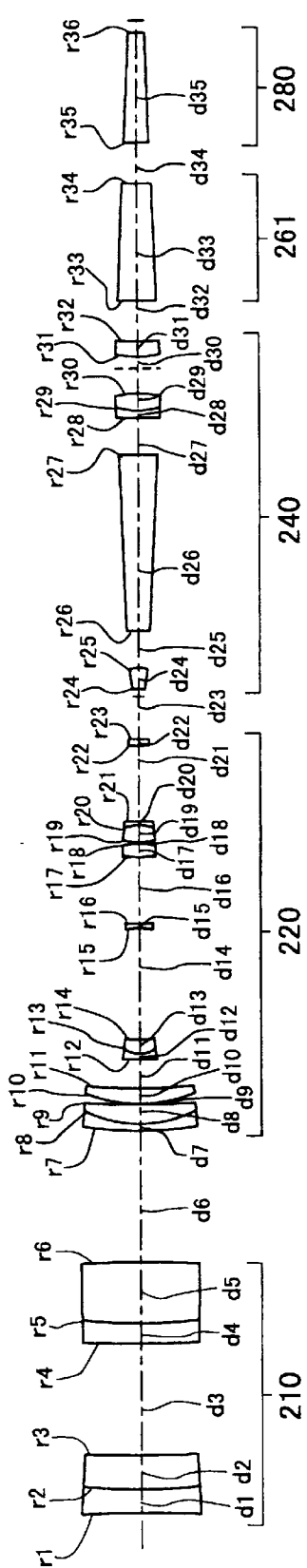
FIG. 11 is a development lens diagram of the image taking optical system according to a second example.

FIG. 11 shows the image taking optical system 200 of the second example in the developed fashion. The numerical constructions thereof are described in TABLE 2. The elements are indicated by the same surface numbers as the first example.

In the second example, the focal length of the close-up optical system 210 is variable in the range of 532.3 mm through 645.3 mm, and the imaging magnification $M_R$ of the relay optical systems 240, 250 is −1.5.

TABLE 2

| Surface Number | r | d | n | vd |
|---|---|---|---|---|
| 1 | −440.000 | 6.50 | 1.51633 | 64.1 |
| 2 | 164.547 | 9.20 | 1.62004 | 36.3 |
| 3 | 472.000 | 30.34 | | |
| 4 | 403.219 | 5.40 | 1.80518 | 25.4 |
| 5 | 141.500 | 16.50 | 1.67003 | 47.3 |
| 6 | −292.600 | 35.66 | | |
| 7 | 96.650 | 2.00 | 1.67270 | 32.1 |
| 8 | 32.889 | 5.50 | 1.61800 | 63.4 |
| 9 | 321.250 | 0.20 | | |
| 10 | 42.000 | 4.00 | 1.61800 | 63.4 |
| 11 | 154.980 | 8.12 | | |
| 12 | −199.500 | 1.50 | 1.83400 | 37.2 |
| 13 | 6.892 | 3.70 | 1.84666 | 23.8 |
| 14 | 18.878 | 30.41 | | |
| 15 | −15.142 | 1.20 | 1.48749 | 70.2 |
| 16 | ∞ | 18.30 | | |
| 17 | 19.083 | 3.80 | 1.49700 | 81.6 |

TABLE 2-continued

| Surface Number | r | d | n | vd |
|---|---|---|---|---|
| 18 | −19.083 | 0.50 | | |
| 19 | 26.525 | 4.50 | 1.48749 | 70.2 |
| 20 | −11.258 | 1.00 | 1.83481 | 42.7 |
| 21 | −378.000 | 21.52 | | |
| 22 | 22.000 | 1.75 | 1.48749 | 70.2 |
| 23 | ∞ | 14.11 | | |
| 24 | −10.476 | 5.56 | 1.51633 | 64.1 |
| 25 | −8.061 | 10.00 | | |
| 26 | ∞ | 47.80 | 1.51633 | 64.1 |
| 27 | ∞ | 10.00 | | |
| 28 | 1313.241 | 2.10 | 1.63636 | 35.4 |
| 29 | 20.933 | 4.70 | 1.51633 | 64.1 |
| 30 | −25.500 | 10.06 | | |
| 31 | 26.908 | 4.30 | 1.51633 | 64.1 |
| 32 | 99.573 | 10.88 | | |
| 33 | ∞ | 32.00 | 1.51633 | 64.1 |
| 34 | ∞ | 10.88 | | |
| 35 | ∞ | 29.87 | 1.51633 | 64.1 |
| 36 | ∞ | — | | |

THIRD EXAMPLE

Figure 12:
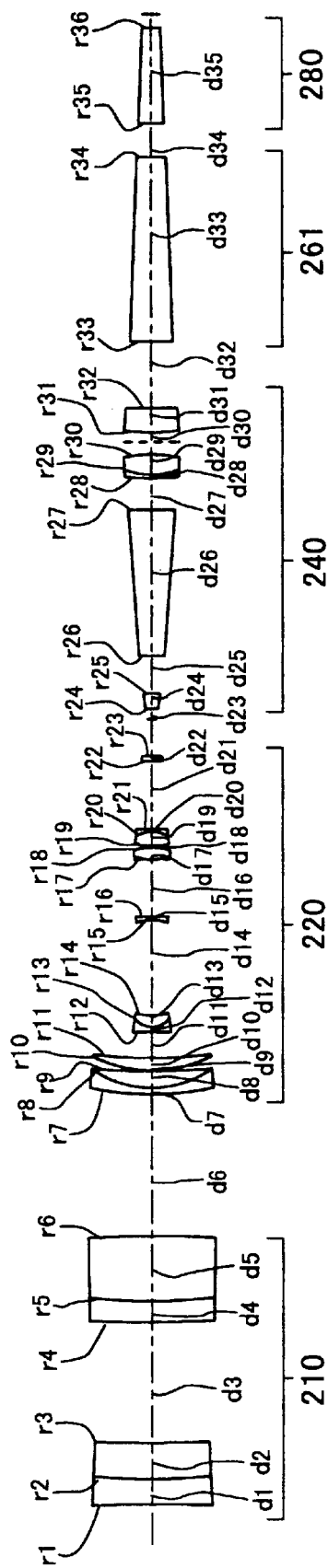
FIG. 12 is a development lens diagram of the image taking optical system according to a third example.

FIG. 12 shows the image taking optical system 200 of the third example in the developed fashion. The numerical constructions thereof are described in TABLE 3. The elements are indicated by the same surface numbers as the first example.

In the third example, the focal length of the close-up optical system 210 is variable in the range of 532.3 mm through 645.3 mm, and the imaging magnification $M_R$ of the relay optical systems 240, 250 is −1.875.

TABLE 3

| Surface Number | r | d | n | vd |
|---|---|---|---|---|
| 1 | −440.000 | 6.50 | 1.51633 | 64.1 |
| 2 | 164.547 | 9.20 | 1.62004 | 36.3 |
| 3 | 472.000 | 30.34 | | |
| 4 | 403.219 | 5.40 | 1.80518 | 25.4 |
| 5 | 141.500 | 16.50 | 1.67003 | 47.3 |
| 6 | −292.600 | 35.66 | | |
| 7 | 77.320 | 1.60 | 1.67270 | 32.1 |
| 8 | 26.311 | 4.40 | 1.61800 | 63.4 |
| 9 | 257.000 | 0.16 | | |
| 10 | 33.600 | 3.20 | 1.61800 | 63.4 |
| 11 | 123.984 | 6.49 | | |
| 12 | −159.600 | 1.20 | 1.83400 | 37.2 |
| 13 | 5.514 | 2.96 | 1.84666 | 23.8 |
| 14 | 15.102 | 24.34 | | |
| 15 | −12.114 | 0.96 | 1.48749 | 70.2 |
| 16 | ∞ | 14.64 | | |
| 17 | 15.266 | 3.04 | 1.49700 | 81.6 |
| 18 | −15.266 | 0.40 | | |
| 19 | 21.220 | 3.60 | 1.48749 | 70.2 |
| 20 | −9.006 | 0.80 | 1.83481 | 42.7 |
| 21 | −302.400 | 17.22 | | |
| 22 | 17.600 | 1.40 | 1.48749 | 70.2 |
| 23 | ∞ | 12.23 | | |
| 24 | −15.413 | 3.87 | 1.48749 | 70.2 |
| 25 | −8.844 | 9.50 | | |
| 26 | ∞ | 37.69 | 1.51633 | 64.1 |
| 27 | ∞ | 8.03 | | |
| 28 | 62.688 | 1.00 | 1.60342 | 38.0 |
| 29 | 18.755 | 5.22 | 1.49700 | 81.6 |
| 30 | −32.801 | 5.50 | | |
| 31 | 48.343 | 6.13 | 1.48749 | 70.2 |
| 32 | −150.785 | 16.68 | | |
| 33 | ∞ | 46.87 | 1.60311 | 60.7 |
| 34 | ∞ | 9.00 | | |

TABLE 3-continued

| Surface Number | r | d | n | vd |
|---|---|---|---|---|
| 35 | ∞ | 23.90 | 1.51633 | 64.1 |
| 36 | ∞ | — | | |

FOURTH EXAMPLE

Figure 13:
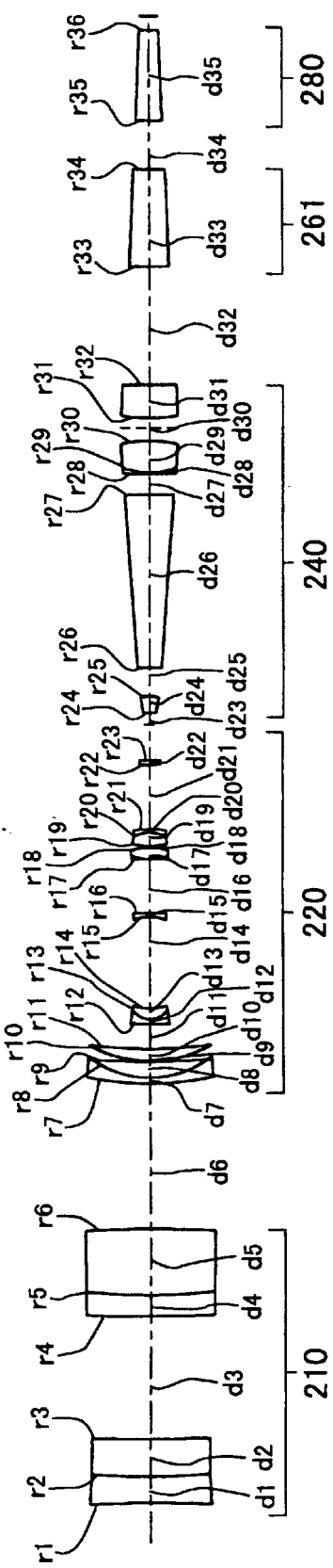
FIG. 13 is a development lens diagram of the image taking optical system according to a fourth example.

FIG. 13 shows the image taking optical system 200 of the fourth example in the developed fashion. The numerical constructions thereof are described in TABLE 4. The elements are indicated by the same surface numbers as the first example.

In the fourth example, the focal length of the close-up optical system 210 is variable in the range of 532.3 mm through 645.3 mm, and the imaging magnification $M_R$ of the relay optical systems 240, 250 is −2.0.

TABLE 4

| Surface Number | r | d | n | vd |
|---|---|---|---|---|
| 1 | −440.000 | 6.50 | 1.51633 | 64.1 |
| 2 | 164.547 | 9.20 | 1.62004 | 36.3 |
| 3 | 472.000 | 30.34 | | |
| 4 | 403.219 | 5.40 | 1.80518 | 25.4 |
| 5 | 141.500 | 16.50 | 1.67003 | 47.3 |
| 6 | −292.600 | 35.66 | | |
| 7 | 72.487 | 1.50 | 1.67270 | 32.1 |
| 8 | 24.667 | 4.12 | 1.61800 | 63.4 |
| 9 | 240.937 | 0.15 | | |
| 10 | 31.500 | 3.00 | 1.61800 | 63.4 |
| 11 | 116.235 | 6.08 | | |
| 12 | −149.625 | 1.12 | 1.83400 | 37.2 |
| 13 | 5.169 | 2.78 | 1.84666 | 23.8 |
| 14 | 14.159 | 22.82 | | |
| 15 | −11.357 | 0.90 | 1.48749 | 70.2 |
| 16 | ∞ | 13.72 | | |
| 17 | 14.312 | 2.85 | 1.49700 | 81.6 |
| 18 | −14.312 | 0.38 | | |
| 19 | 19.894 | 3.38 | 1.48749 | 70.2 |
| 20 | −8.444 | 0.75 | 1.83481 | 42.7 |
| 21 | −283.500 | 16.14 | | |
| 22 | 16.500 | 1.31 | 1.48749 | 70.2 |
| 23 | ∞ | 11.98 | | |
| 24 | −16.338 | 4.05 | 1.48749 | 70.2 |
| 25 | −8.388 | 7.05 | | |
| 26 | ∞ | 43.60 | 1.51633 | 64.1 |
| 27 | ∞ | 5.00 | | |
| 28 | 78.942 | 0.50 | 1.60342 | 38.0 |
| 29 | 19.153 | 8.02 | 1.49700 | 81.6 |
| 30 | −29.748 | 5.50 | | |
| 31 | 41.022 | 8.02 | 1.48749 | 70.2 |
| 32 | −740.383 | 29.60 | | |
| 33 | ∞ | 24.00 | 1.60311 | 60.7 |
| 34 | ∞ | 12.21 | | |
| 35 | ∞ | 22.40 | 1.51633 | 64.1 |
| 36 | ∞ | — | | |

The present disclosure relates to the subject matters contained in Japanese Patent Applications Nos. HEI 11-150830 on May 31, 1999, HEI 11-152636 filed on May 31, 1999 and HEI 11-375021 filed on Dec. 28, 1999, which are expressly incorporated herein by reference in their entireties.

What is claimed is:

1. A stereoscopic microscope comprising:
    a common close-up optical system that faces an object, said close-up optical system having a single optical axis;
    a pair of zoom optical systems that take object light rays passing through the different regions of said close-up optical system, respectively, to form a pair of primary images, the optical axes of said zoom optical systems being parallel to the optical axis of said close-up optical system;

a pair of field stops that are arranged at the positions of said primary images;

a pair of relay optical systems that relay said primary images to form a pair of secondary images;

an inter-axis distance reducing element that brings the object light rays from said relay optical systems close to each other;

an image taking device that captures said secondary images formed on an image taking surface thereof; and an illuminating optical system that guides illumination light emitted from a light source to illuminate said object.

2. The stereoscopic microscope according to claim 1, wherein the diameter of said close-up optical system is set to be larger than the diameter of a circle that includes the maximum effective diameters of said zoom optical systems and the maximum effective diameter of said illuminating optical system.

3. The stereoscopic microscope according to claim 1, wherein each lens of said close-up optical system has a semicircular shape in which one side is cut out, and wherein said illuminating optical system is arranged in the cutout space of said close-up optical system.

4. The stereoscopic microscope according to claim 1, wherein said close-up optical system comprises a first lens group of a negative refractive power and a second lens group of a positive refractive power arranged in that order from the object side, and wherein said second lens group is movable along the optical axis direction for focusing according to the object distance.

5. The stereoscopic microscope according to claim 1, wherein said close-up optical system satisfies the following condition (1)

$$f_A > 500 \tag{1}$$

where $f_A$ is a focal length (unit: mm) of the close-up optical system.

6. The stereoscopic microscope according to claim 1, wherein a plane that includes optical axes of said zoom optical systems is offset in parallel from a meridional plane of said close-up optical system.

7. The stereoscopic microscope according to claim 1, wherein each of said zoom lens systems comprises a first lens group of positive refractive power, a second lens group of negative refractive power, a third lens group of negative refractive power, and a fourth lens group of positive refractive power, in that order from the side of said close-up optical system, and wherein said second lens group and said third lens group move for zooming along the optical axis direction while keeping said first lens group and fourth lens group at constant positions.

8. The stereoscopic microscope according to claim 1, wherein each of said relay optical systems comprises a first lens group of positive refractive power, a second lens group of positive refractive power, and a third lens group of positive refractive power, wherein said first lens group and said second lens group collimate the divergent light passing through said field stops in combination and said third lens group converges the parallel light rays exited from said second lens group.

9. The stereoscopic microscope according to claim 8, wherein each of said relay optical systems includes an aperture stop for controlling an amount of light passing therethrough located between said second lens group and said third lens group of said relay optical system.

10. The stereoscopic microscope according to claim 1, wherein said relay optical systems satisfy the following condition (2);

$$-3 < M_R < -1 \tag{2}$$

where $M_R$ is imaging magnification of the relay optical systems.

11. The stereoscopic microscope according to claim 1, wherein said inter-axis reducing optical element comprises a pair of optical axis shifting prisms, each of the optical axis shifting prisms being provided with incident and exit surfaces that are parallel to each other and first and second internal reflecting surfaces that are parallel to each other.

12. The stereoscopic microscope according to claim 1, wherein said illuminating optical system comprises an illumination lens for projecting the illumination light emitted from said light source and a wedge prism for deflecting the illumination light to coincide the illuminating region with the image taking region.

* * * * *